United States Patent [19]
Hori et al.

[11] Patent Number: 5,593,471
[45] Date of Patent: Jan. 14, 1997

[54] DUST COLLECTING APPARATUS

[75] Inventors: Yoshiaki Hori, Nagoya; Yasuo Akitsu, Handa, both of Japan

[73] Assignee: NGK Insulators, Inc., Japan

[21] Appl. No.: 452,692

[22] Filed: May 30, 1995

[30] Foreign Application Priority Data

May 31, 1994 [JP] Japan ................... 6-118498

[51] Int. Cl.$^6$ ............................... B01D 29/66
[52] U.S. Cl. ................ 55/302; 55/341.1; 55/523
[58] Field of Search ............. 55/284, 302, 303, 55/341.1–341.7, 523

[56] References Cited

U.S. PATENT DOCUMENTS

| | | | |
|---|---|---|---|
| 3,963,467 | 6/1976 | Rolschau | 55/284 |
| 4,046,526 | 9/1977 | Phillippi | 55/302 X |
| 4,161,389 | 7/1979 | Staffin et al. | 432/58 |
| 4,299,597 | 11/1981 | Oetiker et al. | 55/302 X |
| 4,343,631 | 8/1982 | Ciliberti | 55/302 |
| 4,409,009 | 10/1983 | Lissy | 55/302 |
| 4,433,986 | 2/1984 | Borst | 55/302 X |
| 4,445,913 | 5/1984 | Nishiyama | 55/302 |
| 4,504,293 | 3/1985 | Gillingham et al. | 55/302 X |
| 4,525,184 | 6/1985 | Tassicker | 55/302 |
| 4,661,131 | 4/1987 | Howeth | 55/302 |
| 4,904,287 | 2/1990 | Lippert et al. | 55/302 |
| 5,013,341 | 5/1991 | Isaksson et al. | 55/302 |
| 5,062,872 | 11/1991 | Williams | 55/302 |
| 5,078,760 | 1/1992 | Haldipur et al. | 55/302 X |
| 5,094,673 | 3/1992 | Kilicaslan et al. | 55/302 |
| 5,143,530 | 9/1992 | Haldipur et al. | 55/302 X |
| 5,228,892 | 7/1993 | Akitsu et al. | 55/302 X |
| 5,348,568 | 9/1994 | Oda et al. | 55/302 X |
| 5,421,847 | 6/1995 | Akitsu | 55/302 |
| 5,458,665 | 10/1995 | Martin et al. | 55/302 |

FOREIGN PATENT DOCUMENTS

| | | | |
|---|---|---|---|
| 0501733 | 9/1992 | European Pat. Off. | |
| 501733 | 9/1992 | European Pat. Off. | |
| 0620034 | 10/1994 | European Pat. Off. | |
| 4324065 | 1/1995 | Germany | 55/302 |
| 60-172328 | 9/1985 | Japan | 55/302 |
| 4-271806 | 9/1992 | Japan | |
| 4-354506 | 12/1992 | Japan | |
| 2222964 | 3/1990 | United Kingdom | 55/302 |
| WO91/00769 | 1/1991 | WIPO | |

OTHER PUBLICATIONS

Patent Abstracts Of Japan, vol. 17, No. 211 (C–1052) Apr. 26, 1993 & JP–A–04 354506.
Patent Abstracts Of Japan, vol. 17, No. 63 (C1–024) Feb. 8, 1993 & JP–A–04 271806.

*Primary Examiner*—Robert Spitzer
*Attorney, Agent, or Firm*—Parkhurst, Wendel & Burr, L.L.P.

[57] ABSTRACT

A dust collecting apparatus, including a housing having an inlet duct, a discharge duct and filter provided therein. The filter has a honeycomb cellular structure including an inlet, outlet and a plurality of thin partition walls forming a plurality of axial passages. The filter has two groups of passages, a first group of passages that are closed along the inlet end of the filter and second group of passages that are closed along the outlet end of the filter. Further, a cover body is provided in the housing to form a chamber between the cover body and the outlet end of the filter. The chamber is in open communication with the first group of passages, and includes an outlet duct for passage of gas therethrough and to the discharge duct. Further, the housing provides an induction duct that opposes the outlet duct, for introduction of washing gas therethrough.

7 Claims, 7 Drawing Sheets

DUST COLLECTING APPARATUS

BACKGROUND OF THE INVENTION

1. Field of the Invention

The present invention relates to a dust collecting apparatus for purifying various exhaust gases containing dust, and more particularly to a dust collecting apparatus constructed to collect dust from the exhaust gases introduced therein for discharging the gases in a clean condition.

2. Description of the Prior Art

Disclosed in Japanese Patent Laid-open Publications Nos. 271808/1992 and 354506 is a dust collecting apparatus of this kind which includes a plurality of ceramic filter elements aligned in parallel within a housing, each of the filter elements being made of porous ceramic material and having a thin walled cellular structure formed with a plurality of axially extending passages separated from each other by thin partition walls, wherein a first group of the axial passages are closed at their one ends in a checked pattern and opened at their other ends to introduce therein exhaust gases to be purified, while a second group of the axial passages are opened at their one ends to discharge purified gases therefrom and closed at their other ends in a checked pattern, the housing being provided with an outlet duct located at a downstream side of the filter assembly. In the dust collecting apparatus, exhaust gases to be purified are introduced into the first group of the axial inlet passages at an upstream side of the filter assembly so that the thin partition walls of the filter elements act to collect dust from the exhaust gases permeating therethrough from the first group of the axial inlet passages into the second group of the axial outlet passages thereby to purify the exhaust gases. The purified gases are discharged from the housing through the outlet duct while fine particles of the dust are accumulated on the surfaces of the partition walls. During such treatment of the exhaust gases, washing gas under pressure is intermittently supplied into the filter assembly through the outlet duct and flows into the second group of the axial outlet passages to flow into the first group of the axial inlet passages through the partition walls. Thus, the accumulated fine particles are separated from the partition walls.

In such a conventional dust collecting apparatus as described above, the outlet duct is in the form of a spout duct formed with a plurality of equally spaced jet nozzles. The spout duct is spaced in a predetermined distance from the downstream end of the filter assembly to introduce washing gas under high pressure into the second group of the axial outlet passages therefrom for washing the filter elements. In such an arrangement of the spout duct, the reverse washing efficiency of the filter elements is greatly affected by the pressure of washing gas applied to the second group of the axial outlet passages. It is, therefore, required to increase the spout pressure of the washing gas as high as possible for enhancing the reverse washing efficiency of the filter elements. In the dust collecting apparatus, however, the washing gas is directly applied to the downstream side of the filter elements from the jet nozzles of the spout duct. As a result, a portion of the washing gas is discharged outwardly from a discharge duct provided on the housing for discharge of the purified gases. This causes a decrease of the pressure of the washing gas introduced into the second group of the outlet passages and fluctuation of the spout pressure of the jet nozzles, resulting in irregular separation of the accumulated dust at the partition walls.

SUMMARY OF THE INVENTION

It is, therefore, a primary object of the present invention to provide an improved dust collecting apparatus wherein washing gas applied to the downstream side of the filter elements is maintained at a high pressure within the housing to apply a high static pressure to the second group of the axial outlet passages.

According to the present invention, the object is accomplished by providing a dust collecting apparatus which comprises a housing provided with an inlet duct and a discharge duct, one or plural ceramic filter elements disposed within the housing, the single ceramic filter element or each of the plural ceramic filter elements being made of porous ceramic material and having a thin walled cellular structure formed with a plurality of axially extending passages separated from each other by thin partition walls, wherein a first group of the axial passages are in the form of inlet passages closed at their one ends and opened at their other ends to introduce therein exhaust gases supplied from the inlet duct to be purified, while a second group of the axial passages are in the form of outlet passages opened at their one ends to discharge purified gases therefrom through the discharge duct and closed at their other ends, wherein a cover body is assembled with the filter elements at a downstream side thereof to form a closed chamber in open communication with the outlet passages of the filter elements and provided with an outlet duct which opens toward the interior of the closed chamber to permit the purified gases discharged therethrough from the closed chamber toward the discharge duct, and wherein the housing is provided with an induction duct which is opposed to the outlet duct of the cover body to introduce washing gas under pressure into the closed chamber therethrough.

In a practical embodiment of the present invention, it is preferable that an inner opening end of the induction duct is spaced in a predetermined distance from an outer opening end of the outlet duct. It is also preferable that a ratio of the outlet duct and the induction duct in their cross-sections areas is determined to be less than 10.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
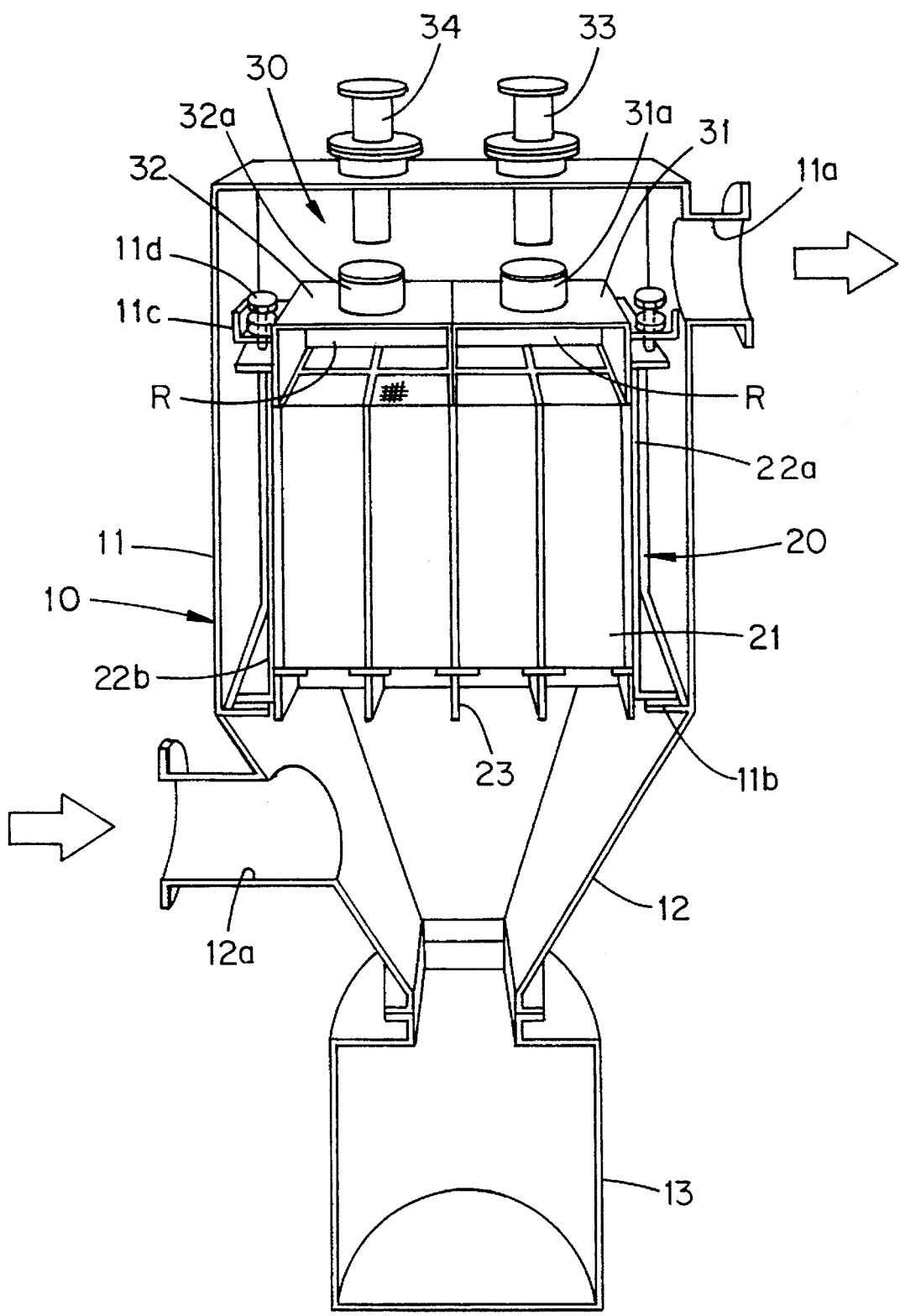
FIG. 1 is a vertical sectional view of a dust collecting apparatus in accordance with the present invention.

In FIG. 1 of the drawings, there is illustrated a dust collecting apparatus which includes a ceramic filter assembly 20 disposed within a housing 10 and a reverse washing mechanism 30 for the filter assembly 20. The housing 10 is composed of a housing body 11 of rectangular in cross-section and a pyramidal hopper 12 assembled with the bottom portion of housing body 11. A cylindrical furnace body 13 is connected to the bottom end of hopper 12, The housing body 11 has a discharge duct 11a formed at an upper side portion thereof for discharge of purified gases, while the hopper 12 has an inlet duct 12a formed at its peripheral wall for supply of exhaust gases to be purified. The ceramic filter assembly 20 is arranged between the inlet duct 12a and the discharge duct 11a.

The ceramic filter assembly 20 is composed of a plurality of filter elements 21 aligned In parallel and clamped by a pair of side plates 22a, 22b. The clamped filter elements 21 are carried by vertical support members 23, The side plates 22a, 22b are supported by a lower rectangular flange 11b of housing body 11 at their lower ends and fixed to side walls of housing body 11 at their upper portions by means of fastening bolts 11d extending through upper rectangular flanges 11c fixed to side walls of housing body 11 to retain the filter assembly 20 in place. The ceramic filter elements 21 each are made of porous ceramic material and have a thin-walled cellular or honeycomb structure of square in cross-section formed with a plurality of axially extending passages separated from each other by thin partition walls. A first group of the axial passages are in the form of inlet passages closed at their upper ends in a checked pattern and opened downwardly at their lower ends to introduce therein exhaust gases to be purified. A second group of the axial passages are in the form of outlet passages closed at their lower ends in a checked pattern and opened upwardly at their upper ends to discharge purified gases therefrom.

Cover bodies 31, 32 each in the form of a bottom open box are secured to upper ends of the side plates 22a, 22b and spaced in a predetermined distance from the upper end of filter assembly 20 to form closed chambers R above the upper end of filter assembly 20. The cover bodies 31, 32 are provided with outlet ducts 31a, 32a which are mounted on each upper wall of cover bodies 31, 32 and extended vertically therethrough. Arranged above the cover bodies 31, 32 are washing gas induction ducts 33, 34 which are mounted on an upper wall of housing body 11 and extended vertically therethrough in such a manner that each inner opening end of induction ducts 33, 34 is opposed to each upper opening end of the outlet ducts 31a, 32a and spaced a predetermined distance therefrom.

In the case that the dust collecting apparatus has been installed to purify exhaust gases discharged from a combustion device such as a diesel engine in a factory plant, the exhaust gases under pressure are supplied into the interior of housing 10 through the inlet duct 12a at the upstream side of the filter assembly 20 and introduced into the inlet passages of filter elements 21. In this instance, the thin partition walls of filter elements 21 act to collect fine particles of dust from the exhaust gases permeating therethrough into the outlet passages of filter elements 21. Thus, the exhaust gases are purified and flow as purified gases into the closed chambers R at the downstream side of the filter elements 21. In turn, the purified gases flow into an upper space of the housing 11 from the closed chambers R through the outlet ducts 31a, 32a and discharged therefrom through the discharge duct 11a outwardly, while the fine particles of dust are accumulated on the surfaces of the partition walls.

During such treatment of the exhaust gases, an electromagnetic valve (not shown) of the reverse washing mechanism is intermittently opened under control of an electric control apparatus (not shown) to supply washing gas under high pressure into the closed chambers R through the induction ducts 33, 34 and outlet ducts 31a, 32a for a predetermined time. In this instance, the pressure in the closed chambers R is increased to a high pressure, and the washing gas is supplied under high pressure into the outlet passages of filter elements 21 to flow into the inlet passages of filter elements 21 through the partition walls of filter elements 21. This increases a difference in pressure between the outlet and inlet passages of filter elements 21. Thus, the accumulated fine particles are uniformly separated from the partition walls of filter elements 21 and fall into the furnace body 13.

During such a reverse washing process of the filter assembly 20, the washing gas spurts out of the induction ducts 33, 34 and flows into the closed chambers R. Thus, the washing gas is temporarily retained in the closed chambers R to increase the internal pressure of the closed chambers R. As a result, the washing gas is supplied under high pressure into the outlet passages of filter elements 21. Accordingly, an amount of the washing gas discharged from the discharge duct 11a is extremely reduced, and the internal pressure of the closed chambers R is efficiently increased. This is useful to enhance the reverse washing efficiency of the filter assembly 20 and to greatly reduce a consumption amount of the washing gas.

Since in the dust collecting apparatus the internal pressure of the closed chambers R is uniformly increased by the washing gas supplied from the induction ducts 33, 34, the static pressure applied to the outlet passages of filter elements 21 from the closed chambers R is uniform such that the accumulated fine particles are uniformly separated from the partition walls of filter elements 21.

Figure 2:
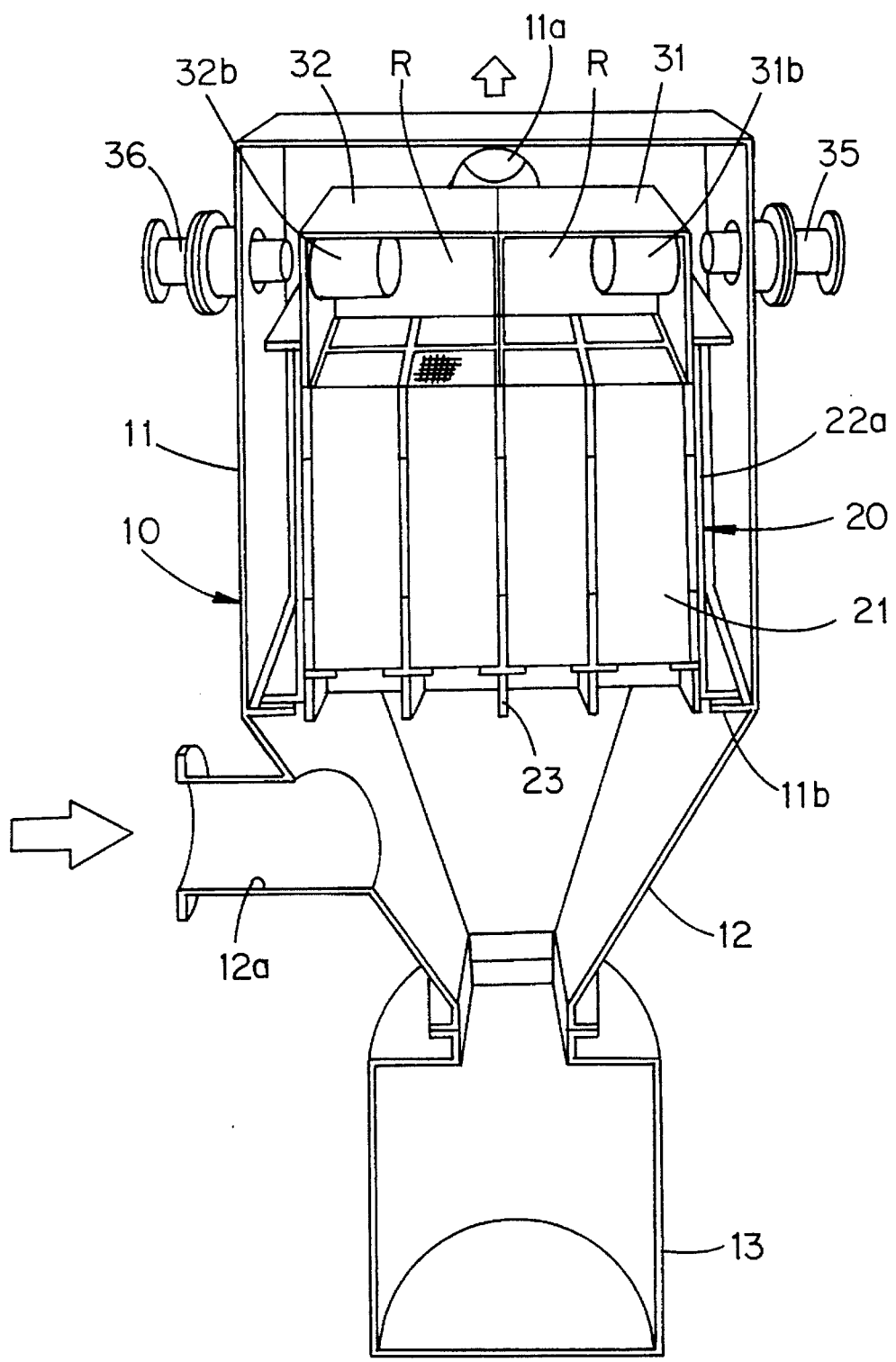
FIG. 2 is a vertical sectional view of a modification of the dust collecting apparatus shown in FIG. 1.

Illustrated in FIG. 2 is a modification of the dust collecting apparatus, wherein the same components and portions as those in the above embodiment are designated by the same reference numerals. In this modification, outlet ducts 31b, 32b corresponding with the outlet ducts 31a, 32a in the above embodiment are mounted on side walls of the cover bodies 31, 32 and extended horizontally therethrough into the closed chambers R. Induction ducts 35, 36 corresponding with the washing gas induction ducts 33, 34 in the above embodiment are mounted on side walls of the housing body 11 and extended horizontally therethrough into the interior of housing body 11 in such a manner that each inner opening end of the induction ducts 35, 36 is opposed to each outer opening end of the outlet ducts 31b, 32b and spaced a predetermined distance therefrom.

During treatment of exhaust gases in the modified dust collecting apparatus, fine particles of dust contained in the exhaust gases are collected at the partition walls of the filter elements 21 and accumulated on the surfaces of the partition walls. In operation of the reverse washing mechanism 30, the washing gas is supplied into the closed chambers R through the horizontal induction ducts 35, 36 and outlet ducts 31b, 32b and supplied into the outlet passages of the filter elements 21 under high pressure. Thus, the accumulated fine particles are separated from the partition walls under a difference in pressure between the outlet and inlet passages and fall into the furnace body 13 through the hopper 12.

Figure 3:
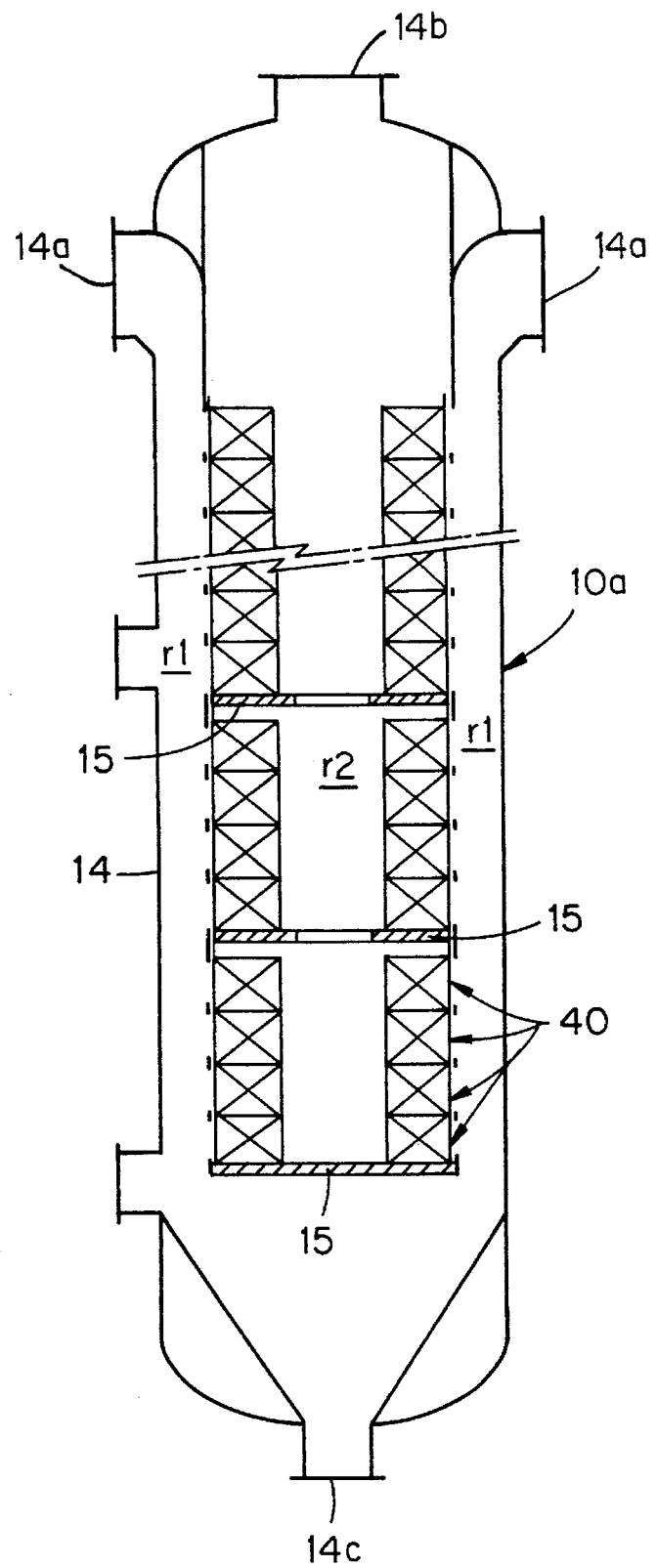
FIG. 3 is a vertical sectional view of another embodiment of a dust collecting apparatus in accordance with the present invention.

Illustrated in FIG. 3 is another embodiment of a dust collecting apparatus In accordance with the present invention, which includes an upright cylindrical housing 14 provided therein with a plurality of circumferentially spaced lateral support beams 15 arranged at vertically equally spaced plural steps to form a plurality of circumferentially spaced vertical gas induction passages r1 along an internal peripheral surface of the housing 14 and a vertical discharge passage r2 at the center of the housing 14, and plural sets of circumferentially spaced filter assembly units 40 vertically mounted on each of the support beams 15 in such a manner that the filter assembly units 40 are exposed at their outer ends to the gas induction passage r1 and at their inner ends to the discharge passage r2. The cylindrical housing 14 is provided at its upper side walls with inlet ducts 14a and at its upper end with a discharge duct 14b. In operation of the dust collecting apparatus, exhaust gases containing dust are supplied into gas induction passages r1 through the inlet ducts 14a and introduced into the respective filter assembly units 40 under a difference in pressure between the gas induction passages r1 and discharge passage r2. Thus, purified gases are discharged from the filter assembly units 40 into the discharge passage r2, while fine particles of dust are accumulated in the filter assembly units 40. The purified gases are discharged from the discharge passage r2 through the discharge duct 14b outwardly.

Figure 4:
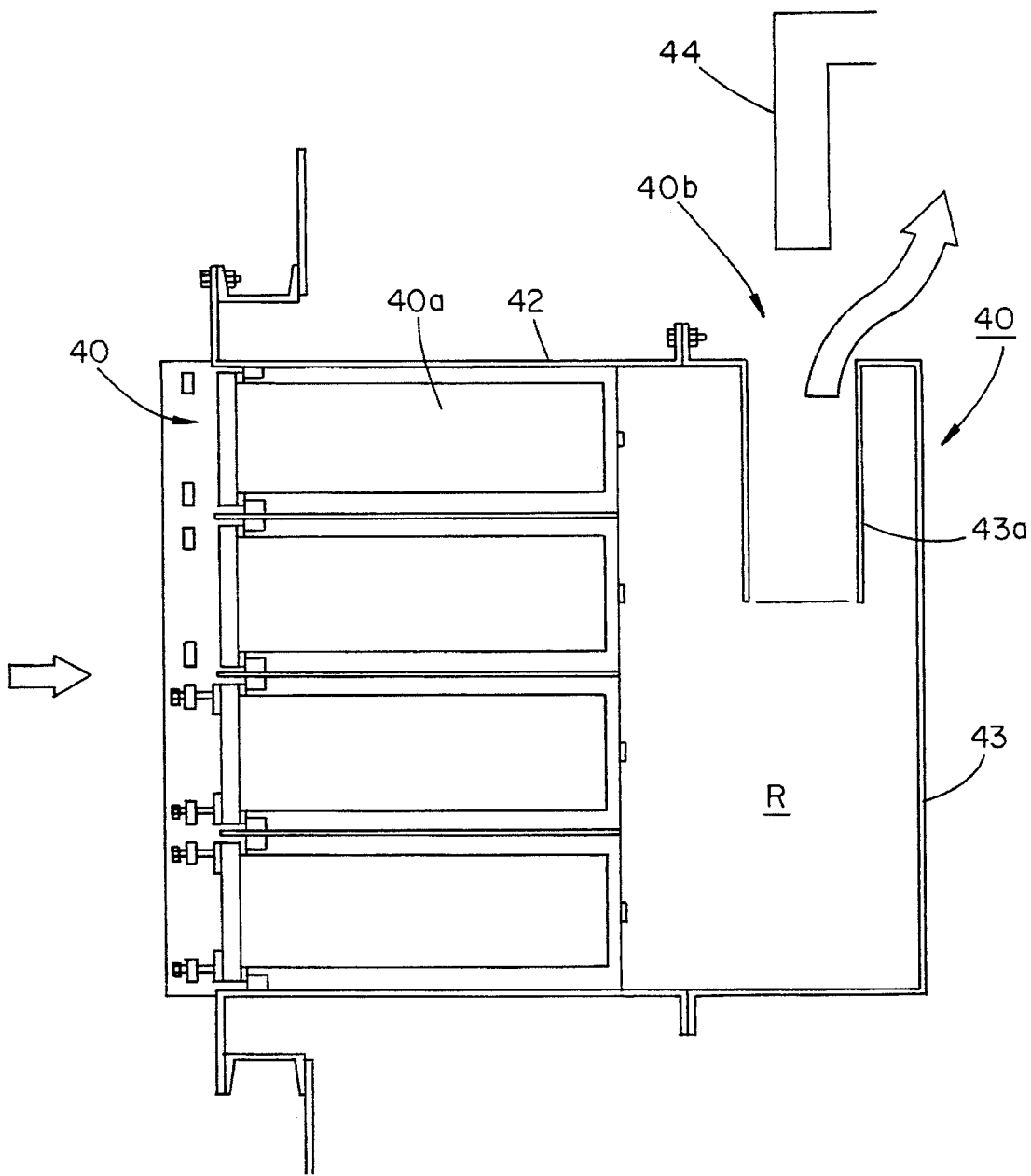
FIG. 4 is an enlarged sectional view of a filter assembly unit shown in FIG. 3.

As shown in FIG. 4, the filter assembly units 40 each are composed of a plurality of ceramic filter elements 40a horizontally arranged in parallel to one another and mounted within a casing 42. The ceramic filter elements 40a each are formed in the same construction as those in the dust collecting apparatus shown in FIGS. 1 and 2. The filter assembly units 40 each are provided with a reverse washing mechanism 40b which includes a cover body 43 secured to an opening end of the casing 42 to form a closed chamber R in open communication with the outlet passages of the filter elements 40a. The cover body 43 has an outlet duct 43a integrally formed at its upper wall and extended a predetermined distance into the interior of the closed chamber R. Arranged above the cover body 43 is a washing gas induction duct 44 which is opposed to an upper opening end of the outlet duct 43a and spaced therefrom a predetermined distance. The induction duct 44 is extended outwardly through the peripheral wall of cylindrical housing 14 and connected to a source of washing gas under pressure (not shown).

In the dust collecting apparatus shown in FIG. 3, exhaust gases to be purified are introduced into the ceramic filter assembly units 40 from the inlet ducts 14a through the gas induction passages r1 and purified by the filter elements in the ceramic filter assembly units 40. The purified gases are introduced into the discharge passage r2 through the closed chambers R and outlet ducts 43a and discharged outwardly from the discharge duct 14b. During such treatment of the exhaust gases, fine particles of dust contained in the exhaust gases are collected at the partition walls of the filter elements and accumulated on the surfaces of the partition walls.

In operation of the reverse washing mechanisms, each electromagnetic valve (not shown) of the reverse washing mechanisms is opened to supply washing gas under high pressure into the closed chambers R through the induction ducts 44 of the filter assembly units 40 for a predetermined time. In this instance, the pressure in the closed chambers R is increased to a high pressure, and the washing gas is supplied under high pressure into the outlet passages of the filter elements in the respective filter assembly units 40 to flow into the inlet passages of the filter elements through the partition walls. This increases a difference in pressure between the outlet and inlet passages of the filter elements. Thus, the accumulated fine particles are uniformly separated from the partition walls of the filter elements and fall into a container chamber (not shown) from the hopper 14c.

During such a reverse washing process of the filter assembly units 40, the washing gas spurts out of the induction ducts 44 and flows into the closed chambers R. Thus, the washing gas is temporarily retained in the closed chambers R to increase the internal pressure of the closed chambers R. As a result, the washing gas is supplied under high pressure into the outlet passages of the filter elements without causing any discharge Into the discharge passage r2. This is useful to enhance the reverse washing efficiency of the filter assembly units 40 and to greatly reduce a consumption amount of the washing gas. Since In the dust collecting apparatus the internal pressure of the closed chambers R is uniformly increased by the washing gas supplied from the induction duct 44, the static pressure applied to the outlet passages of the filter elements from the closed chambers R is uniform such that the accumulated fine particles are uniformly separated from the partition walls of the filter elements.

Figure 5:
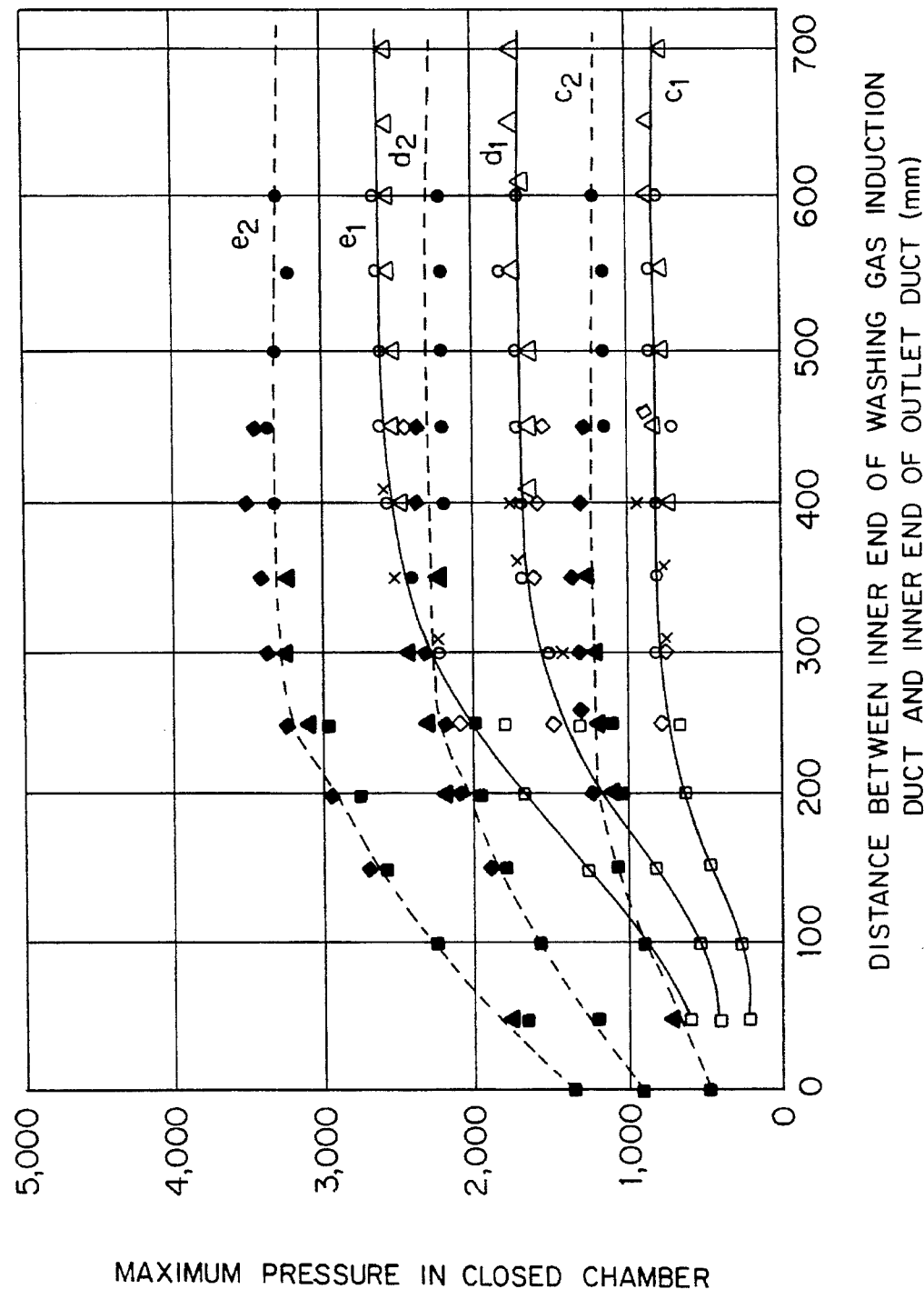
FIG. 5 is a graph showing a maximum pressure in a closed chamber in relation to a distance between an inner opening end of a washing gas induction duct and an inner opening end of an outlet duct shown in FIG. 2
Figure 6:
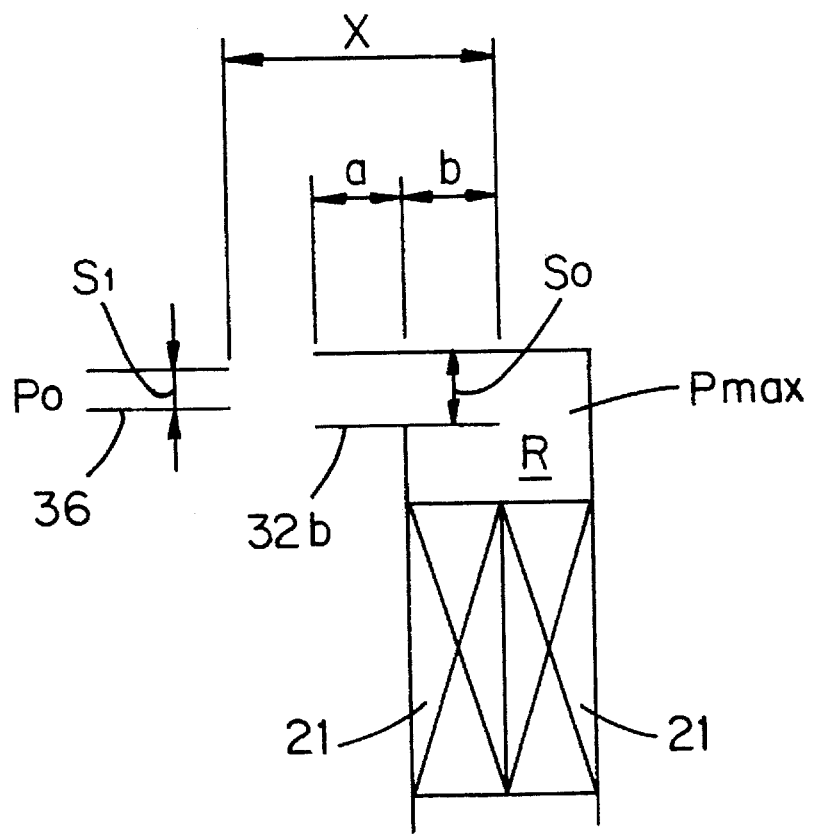
FIG. 6 is a schematic illustration of a reverse washing mechanism adapted to the dust collecting apparatus shown in FIG. 2.

In a graph of FIG. 5, a maximum pressure in the closed chambers R is shown in relation to a distance X(mm) between each Inner opening end of induction ducts 35, 36 and each inner opening end of outlet ducts 31b, 32b in the dust collecting apparatus shown in FIG. 2. In FIG. 6 there is schematically illustrated the arrangement of induction duct 36 and outlet duct 32b in the dust collection apparatus of FIG. 2 to demonstrate a result of experiments conducted under conditions listed in the following table.

TABLE

| a (mm) | b (mm) | Ratio in cross-section ($s_0/s_1$) | |
|---|---|---|---|
| | | (6.25) | (4.0) |
| 150 | 300 | ○ | ● |
| 250 | 300 | △ | — |
| 0 | 300 | ◇ | ◆ |
| 0 | 200 | — | ▲ |
| 0 | 100 | □ | ■ |
| 300 | 0 | X | — |

Figure 7:
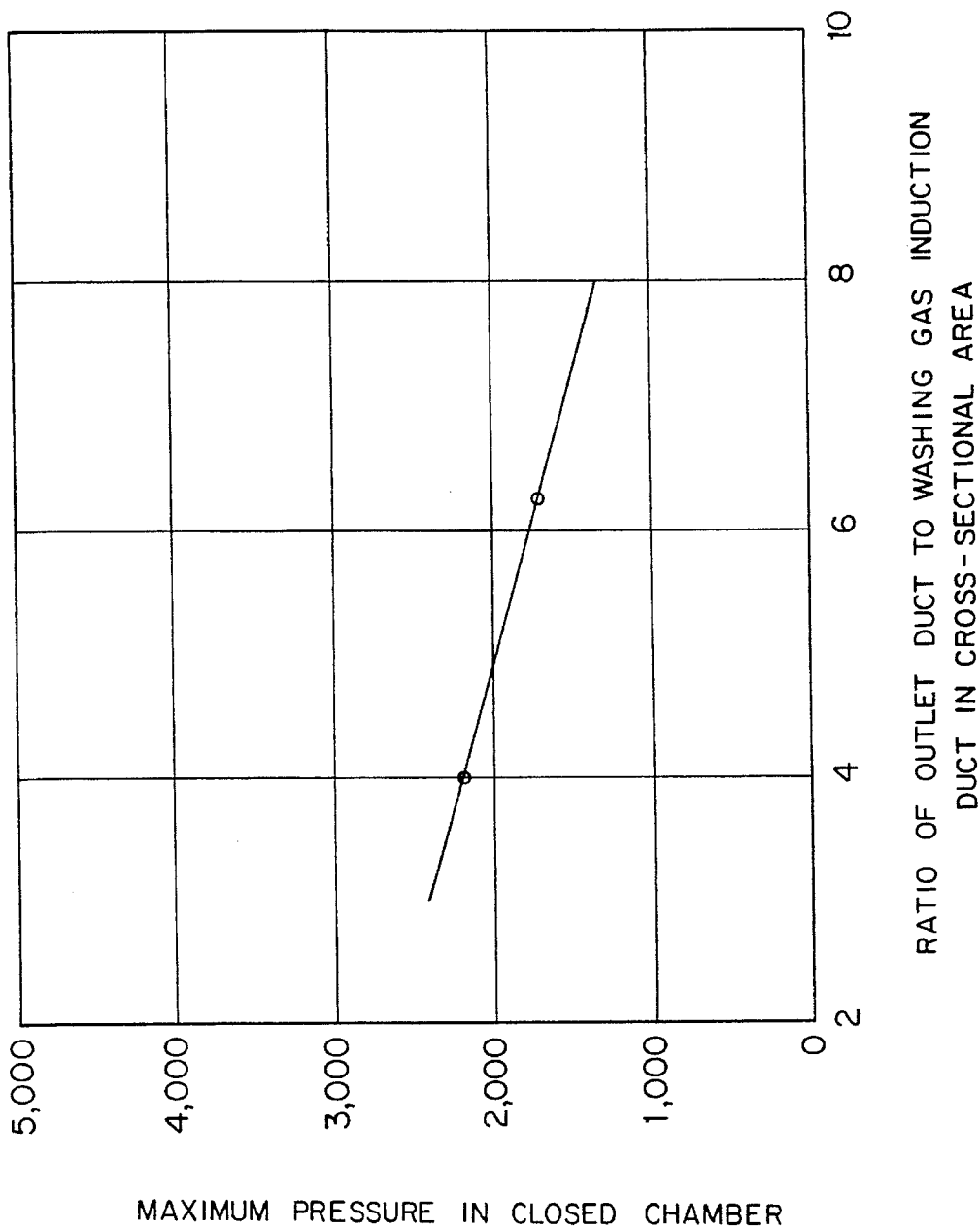
FIG. 7 is a graph showing a maximum pressure in the closed chamber in relation to a ratio of the outlet duct and the washing gas induction duct in their cross-sectional areas.

In the graph of FIG. 5, curves c1, c2 were plotted in the case that the pressure P0 at the induction duct 36 was 1 kg/cm²G, curves d1, d2 were plotted In the case that the pressure P0 at the induction duct 36 was 2 kg/cm²G, and curves e1, e2 were plotted in the case that the pressure P0 at the induction duct 36 was 3 kg/cm²G. The solid curves c1, d1, e1 were obtained in a condition where a ratio ($s_0/s_1$) of the cross-sectional area $s_0$ of the outlet duct 32b to the cross-sectional area $s_1$ of the induction duct 36 was determined to 6.25. The broken curves c2, d2, e2 were obtained in a condition where a ratio ($s_0/s_1$) of the cross-sectional areas $s_0$ and $s_1$ was determined to be 4.0. In a graph of FIG. 7, a maximum pressure Pmax(mm Aq) obtained under the following condition is illustrated in relation to the ratio $s_0/s_1$ of the cross-sectional areas.

Pressure P0 at the induction duct: 2 kg/cm²

Distance X: 600 mm

Length a, b: 150 mm, 300

With the foregoing experiments, it has been found that if the distance X between the inner opening end of the induction duct 36 and the inner opening end of the outlet duct 32b is determined to be more than a predetermined distance, a maximum pressure Pmax in the closed chamber R becomes constant regardless of the length a, b of the outlet duct 32b. To obtain a maximum pressure Pmax in the closed chamber in the dust collecting apparatus according to the present invention, it is preferable that the distance X is determined to be move than 200 mm, and it is preferable that the ratio s0/s1 of the outlet duct 23b and induction duct 36 in their cross-sectional areas is determined to be less than 10.

What is claimed is:

1. A dust collecting apparatus, comprising:

a housing including an inlet duct and a discharge duct, the housing having a filter provided therein, the filter having a honeycomb cellular structure including an inlet end, an outlet end, and a plurality of thin partition walls forming a plurality of axial passages, wherein the filter has a first group of passages closed along the inlet end of the filter and open along the outlet end of the filter, and a second group of passages that are open along the inlet end of the filter and closed along the outlet end of the filter; and a cover body provided in the housing to form a chamber between the cover body and the outlet end of the filter, said chamber being in open communication with the first group of passages, said cover body being provided with an outlet duct for passage of gas therethrough and to the discharge duct, and said housing being provided with an induction duct that opposes the outlet duct, whereby washing gas is introduced through the induction duct and passes through the outlet duct and into the chamber.

2. The apparatus of claim 1, wherein the housing comprises a plurality of filters.

3. The apparatus of claim 1, wherein said induction duct has a tubular structure including an interior open end that is spaced apart from outlet duct by a predetermined distance.

4. The apparatus of claim 3, wherein said outlet duct has a tubular structure.

5. The apparatus of claim 1, wherein a ratio of a cross-sectional area of the outlet duct to a cross-sectional area of the induction duct is less than 10.

6. The apparatus of claim 3, wherein said predetermined distance is greater than 200 mm.

7. The apparatus of claim 1, wherein said outlet duct has a tubular structure and extends into the interior of the chamber for flow of gases therethrough from the filter and to said discharge duct.

* * * * *